Sept. 10, 1968 N. G. E. STEMME 3,401,374

CHECKING ARRANGEMENT FOR PASSING PERSONS, PARTICULARLY FOR CHECKING THE WORK-TIME

Filed July 15, 1965 5 Sheets-Sheet 1

Sept. 10, 1968 N. G. E. STEMME 3,401,374
CHECKING ARRANGEMENT FOR PASSING PERSONS, PARTICULARLY FOR CHECKING THE WORK-TIME
Filed July 15, 1965 5 Sheets-Sheet 5

United States Patent Office
3,401,374
Patented Sept. 10, 1968

3,401,374
CHECKING ARRANGEMENT FOR PASSING PERSONS, PARTICULARLY FOR CHECKING THE WORK-TIME

Nils Gustaf Erik Stemme, Snorregatan 3F, Kungalv, Sweden

Filed July 15, 1965, Ser. No. 472,156
Claims priority, application Sweden, July 17, 1964, 8,784/64
15 Claims. (Cl. 340—172.5)

ABSTRACT OF THE DISCLOSURE

A system for recording the presence and absence or arrival and departure of persons to and from a factory, office, enclosure, etc., comprises at least one switch panel connected to the input of a memory the output of which is connected to a recorder such as a tape recorder for punched strips or magnetic tape. The switch panel is provided with manual switches, one for each person to be checked. Each switch has two stable visual states indicating by the position of a switch toggle, signal lamp or the like, the presence or absence, respectively, of the person to which the switch is allotted (labelled). Each switch has one or two pulse contacts being temporarily closed when the switch is changed over from one stable position to the other, whereby a "set" pulse generator being common to all of the switches is temporarily connected to a "set" line output of the switch and transmits one set pulse to this line. The set lines are connected to separate memory elements of the memory, such as a magnetic core matrix memory, so that any element receiving a pulse from the associated switch and set line is set owing to the temporary movement of the switch. At cyclically repeated intervals, and independent on whether none, one or more of the memory elements are in the set state, the memory is read and reset, the resetting operation being interrupted, if required, as long as the information read from a core is recorded.

Figure 1:
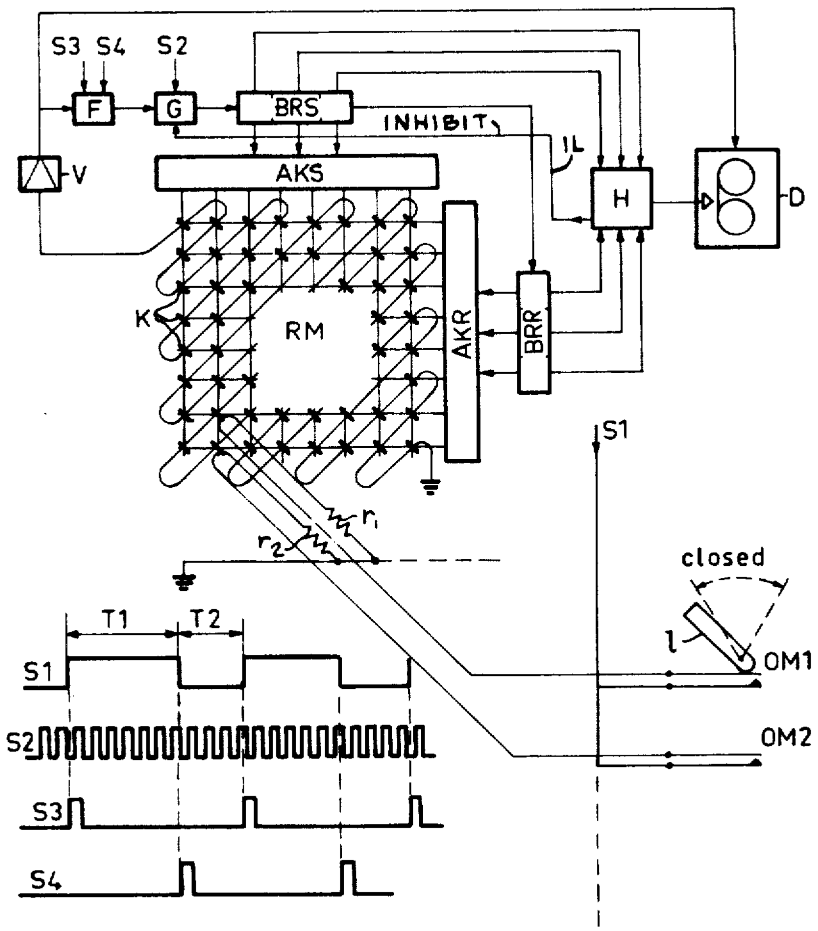

At least one separate memory element is set by the output of a clock-time pulse generator and is likewise read during every reading cycle so that the read output of the memory represents arrival and departure of all persons to be checked and being identified by their respective memory elements and, directly or indirectly, the clock time of every recorded arrival and departure. The output of the memory is recorded by the recorder which moves one step for every record. The time may be recorded either as a clock time code accompanying every personal record or as clock pulse records, one for every minute, so that in the latter case the absolute clock time of a record can be determined by accumulative counting of the recorded clock pulses from a datum instant to the instant of any personal record being read out.

Thus, the records are such that the information of the tape can be supplied to a computer which adds, separately for every person, the time periods of presence to obtain the total time of presence of any person during, say, a week, and also indicates any late arrivals and early departures.

The system may be designed such that the number of said set conductors is less than the number of switches and persons to save the number of set lines through which the panel or panels are connected to a remote memory and recorder.

This invention relates to the information storage and retrieval art, and is concerned with the provision of improved apparatus for recording the arrivals and departures of persons, particularly for checking the work times of employees at a work place.

It is usual to check the presence of employees within enterprises, authorities, etc., by means of time recorders. If, for example the presence and arrival of 1,000 persons is to be checked in this manner, about 48,000 time cards are produced each year (if pay deductions for vacancies and other kinds of absence are to be made) and said cards shall be handled, checked and possibly stored. Often overtime pay is calculated with the aid of the time cards, and in this case the time checking and the calculation of overtime pay is very time consuming. In addition, if 1,000 persons have a common work time, about 20 time recording clocks are required to avoid queues. It is practically impossible to use the time cards directly or indirectly in data processing machines or punched card machines, as this would require imprinting or punching a code on the tickets by means of the time clock.

Instead it is possible to provide contact banks in the form of switch panels having one switch for each person. Such panels are known, and they usually cooperate with lamp displays in another place. It has, however, not been possible to use such switch panels with any kind of recorders for direct or indirect automatic evaluation of the recorded times.

According to the invention the times may be recorded remote from the switch panel or panels on which the switches are mounted, for example on punched tape or magnetic tape in such a manner that the records can be fed into a computer without the need to check or sort them manually. In the computer it is possible to select the desired work routine. When the invention is used for checking the presence of persons, the computer may sum the total work time of each checked person for each week or month. The computer may, then print a report which lists each person who arrived late or departed early during a certain period (week or month). Such a report shows all these persons and the number and date of late arrivals (corresponding to red time records) and if desired also the sum of lost time. Overtime and overtime pay can be reported in the same way, etc. The computer can print either a list of all persons or individual reports for each person, automatically indicating the name or code of the person, as well as actual time or date. Special embodiments of the invention have the important advantage that there are considerably fewer conductors between the switch panels including the switches and the other parts of the system, than there are contacts in the switch panel, it not being necessary to scan contacts of the switches one after the other, but only the memory elements.

Figures 2, 3:
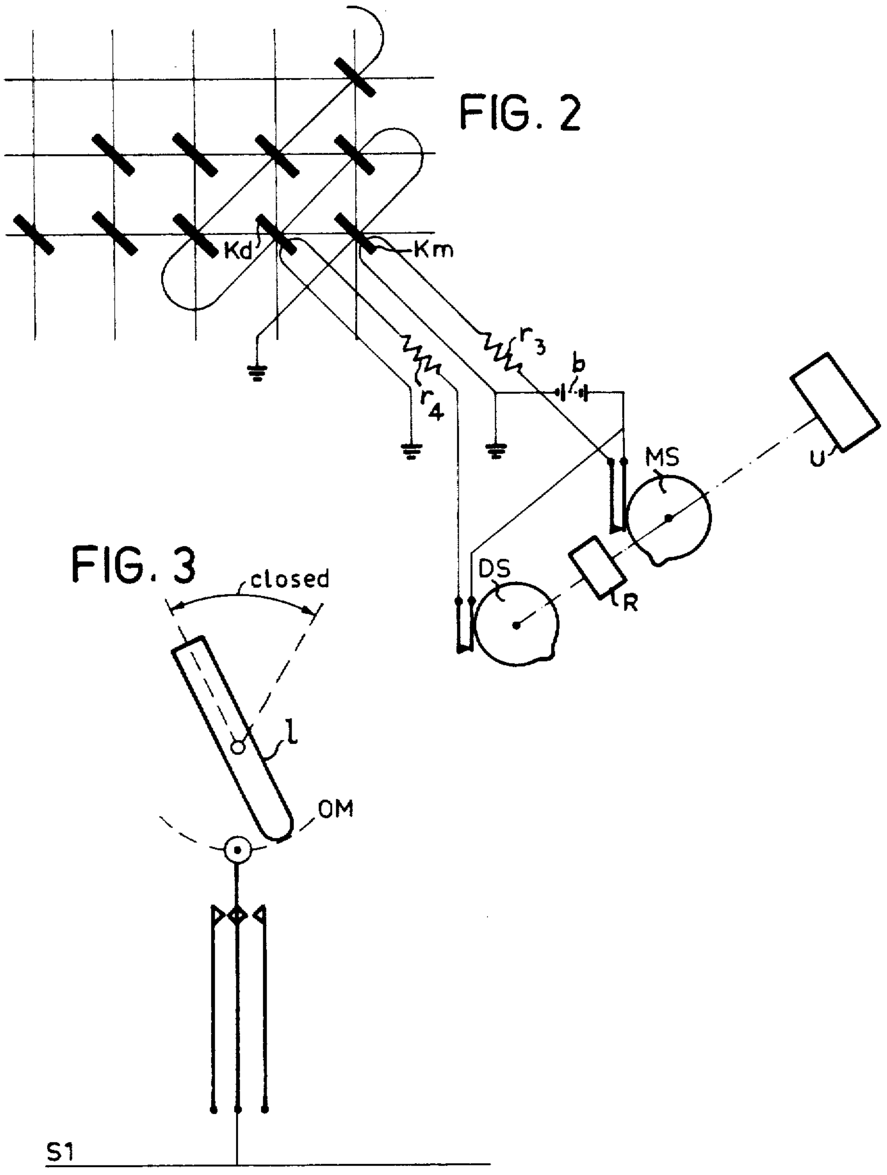
Figure 4:
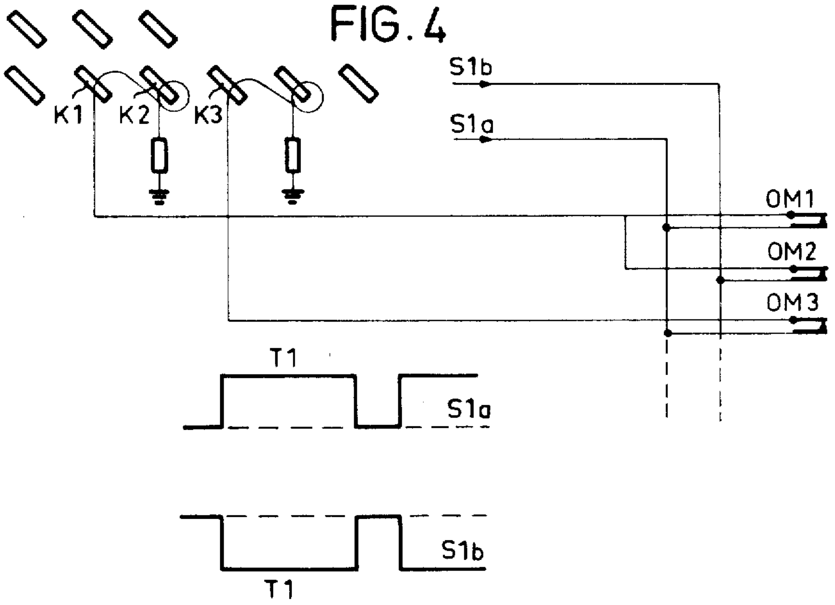
Figure 5:
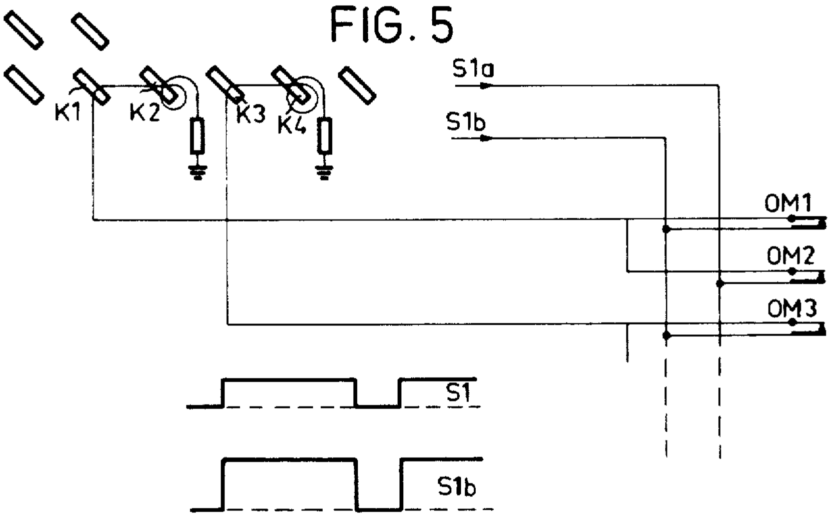
Figures 6, 7:
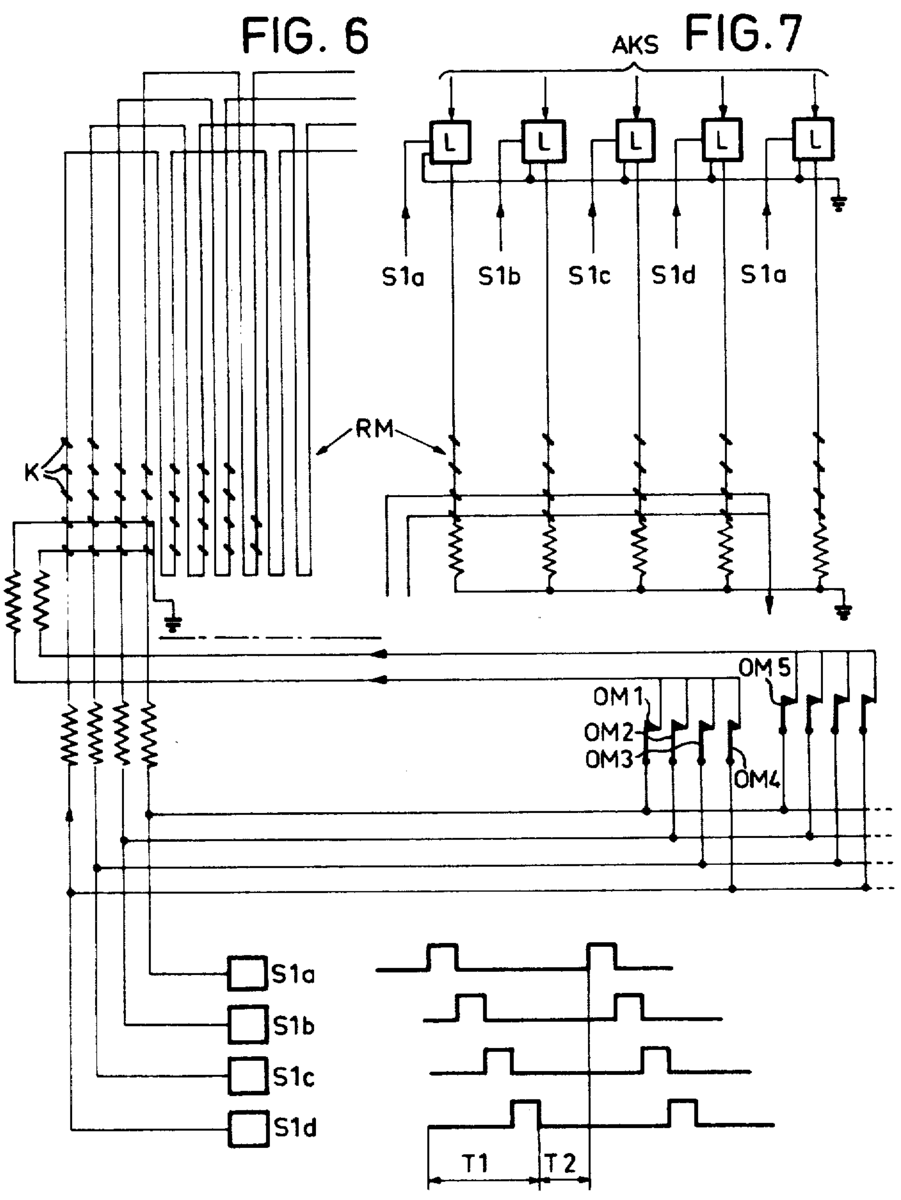
Figure 8:
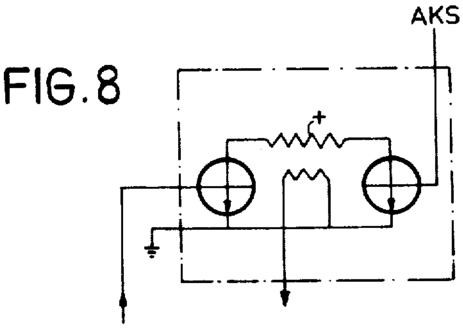
Figure 9:
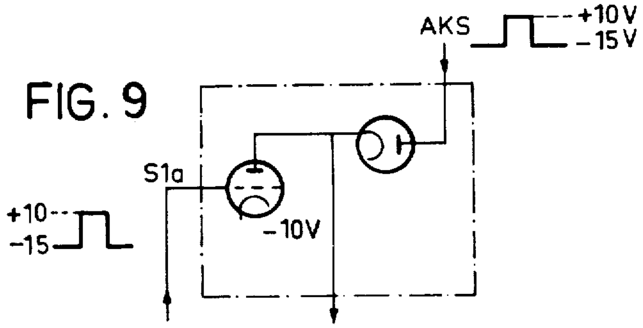

In the following the embodiments are described which are shown as examples on the attached drawings. FIG. 1 shows a system according to the invention for checking the presence, and absence of persons, and the shape of control signals. FIG. 2 shows a part of such a system cooperating with a clock time pulse generator. FIG. 3 shows an example of the contacts of a contact bank for controlling a system according to the invention. Each of FIGS. 4–6 shows a part of a matrix and a control arrangement used in different embodiments of the system of FIG. 1 and certain of the signals controlling the system and where the number of required control conductors being low. FIGS. 7, 8 and 9 show modifications of FIG. 6.

First it is to be remarked, that the matrices described in the following need not necessarily be magnetic core matrices, and it is not necessary that the driving signals are currents as they may be voltages, for example when using registers comprising electronic capacitive memory elements. The memory elements of the matrix need not be bistable but may be monostable with a delayed resetting so that they, after having been set, slowly return to the reset state. The only requirement is that the delay exceeds the period required for reading each memory element before the element spontaneously leaves the set state, or for reading and controlled resetting of the element.

It is not necessary that the matrix is read by means of a read wire common to all memory elements as it is possible to provide one read wire for each element or each group of elements to make possible parallel read out.

For reasons partly explained more below one or more memory elements and/or one or more switches may be provided for each person to be checked. If it is necessary to indicate not only that a person has passed through an entrance but also where he is staying and whether he has passed in or out, several memory elements are required for each person. If it is to be possible to check a person at several places, for example several factory entrances, several switches must be allotted to him but not necessarily several memory elements, unless it is required that record be kept as to for example, the entrance used by him or a statement if he has arrived or departed is to be recorded.

FIG. 1 is a schematic diagram of a checking arrangement according to the invention. A register, assembled from memory elements, here shown as a magnetic ring core matrix RM, consists of for example 64 memory elements constituted by ferrite cores K located in eight rows and eight columns associated with corresponding row and column conductors. In addition there are set (marking) conductors, one for each core, and a read (output) conductor common to all cores. One end of each of the column conductors is connected to a individual output of a translator (code translator or decoder) AKS and one end of each of the row conductors is connected to a individual outputs of another translator AKR. The other ends of the column and row conductors are grounded through separate load resistors not shown in FIG. 1. The arrangement just described substantially corresponds to the device described in U.S. Patent No. 3,017,611 (corresponding to British Patent No. 841,893 and the Swedish Patent 179,643). Each of the set conductors is connected through resistors $r_1$, $r_2$ and separate, manually operable snap-over, i.e., toggle switch OM1, OM2, etc., between ground and a signal conductor S1, the toggle switch lever being designated $l$. The read out conductor is connected between the input of an amplifier V and ground. The output of the amplifier is connected to the feed circuit D for feeding a paper tape which is to be punched by a tape punch H and is also connected to one of three inputs of a flip-flop F. The output of the flip-flop F is connected through a coincidence gate (and gate) G to the input of a binary counter BRS. This counter has three stages and has thus three outputs which are connected to the corresponding inputs of the code translator AKS. Said outputs of the counter BRS or separate, parallel outputs are connected to the punch H. The counter BRS has in addition a transfer output connected to the input of another three stage binary counter BRR. In addition this binary counter BRR is connected to the pertaining code translator AKR and the tape punch H in the same way as the first binary counter BRS.

Pulse sources which are not shown in detail generate pulse signals S1–S4 having the waveforms shown at the lower part of FIG. 1 to the signal conductors which are here correspondently designated S1–S4. At least the signal sources S1, S3 and S4 operate in fixed phase relationship since, for example the signals S3 and S4 are generated by differentiating the front and rear edges, respectively of the signal S1. In relation to the signals S1, S3 and S4 the pulse frequency of the signal S2 is considerably higher than is shown in FIG. 1.

Each snap-over switch OM1, OM2, etc., is provided with a pair of monostable pulse contacts (so-called passing contacts) and bistable means for manual operation, suitably in the shape of a toggle having two stable positions. When the toggle is switched between these two positions the contacts are temporarily closed as long as the toggle is moved through the angle designated "closed." In the two stable end positions of the toggle, however, the switch is open. The angle "closed" must not be too small, because the period during which the contacts are closed must not be too short when the toggle is operated. Said period must not be shorter than the period T2 between the positive-going pulses of the signal S1 according to FIG. 1. The position of the toggle visually indicates the presence or absence of the person having the switch toggle allotted to him. It is possible to use a conventional double throw (change-over) switch having bistable contacts and levers (toggles) and controlling one or two relays provided with monostable passing contacts (pulse contacts). Also other kinds of single pulse generating devices may be used, such as electronic pulse switches, DC contacts provided with a differentiating, and, thus, pulse generating networks such as a resistance-capacitance network, etc. The snap-over switches may in a known manner be so designed that their closed period (make period) is substantially independent of how rapid and for how long a time the means for manually operating the same are actuated.

When two cores are used for each person for separately indicating "arrival" and "departure," it is also possible to use a circuit having two cores per set conductor and being similar to that shown in FIG. 4 or 5. The number of contacts OM and, thus, the number of cores or pairs of cores is at least equal to the greatest number of persons the arrival and departure of which is to be checked. Close to the manual switches OM there are interchangeable name labels and the switches are mounted on one or more switch panels which, for example, are located at one or more entrances to a factory. All the other elements of the arrangement described below can be located on another, possibly remote place. One and the same person may have several, electrically parallel connected pulse switches OM allotted to him, which may be located on different switch panels at different entrances of a factory area, office building, etc. In such a case the employees need not, as hitherto, pass through a determined entrance to check in. The switch panel or panels may be provided with a signal lamp which is lighted during the official worktime, to show that late arrival or early departure will be recorded. This lamp is controlled by the same clock which controls the time recordings on a check tape or a similar record.

The arrangement operates in the following manner. The pulse signals S1–S4 are continuously supplied to the switches OM. The signal S1 has different levels during the periods T1 and T2, the level during T2 being suitably zero. During the period T2 the matrix is scanned and, simultaneously, any set cores K are reset. As has already been mentioned the period T2 is shorter than the shortest period during which any contact OM is closed by operation of a toggle, so that the closing of contacts is reliably recorded by the matrix. For example, the periods T1 and T2 may have a duration of 8 and 2 milliseconds, respectively, while the switch OM may be designed to have a minimum closed period of 10 milliseconds, no matter how rapidly the lever is switched over. By closing the contacts of a switch a marking pulse is passed from the conductor S1 through the contacts and the pertaining set conductor of the matrix core during the period T1. The pulse is a so called "whole current," i.e., it has such an amplitude that the core is magnetized to the "set" state without the need of a coincident second pulse.

The binary counter BRS is rapidly stepped by the pulse signal S2 which is applied to the input of the counter through the gate G. Consequently the translator AKS is successively fed with binary numbers and supplies corresponding half currents successively to the column conductors, but only to one conductor at a time. When the binary counter BRS for example is stepped to the indication 011, the translator supplies a pulse to the third column conductor (from the left in FIG. 1), as the binary number 011 equals the decimal number 3. As the binary counter BRS in this case has three digit sections, it exceeds its capacity after having delivered a pluse to the eighth, i.e., the last, column conductor. Then it delivers a carry pulse to the binary counter BRR provided for the row conductors, which is stepped and supplies a half current to the next row conductor through the translator AKR. As a result, the cores of the matrix are sequentially fed with reset pulses, composed of the two coincident half currents originating from the two translators AKS and AKR. If a set core is detected during this reset operation, the core is reset causing a pulse to appear in the read conductor at the instant when the two binary counters BRS and BRR are stepped to a value identifying the core and, thus, also the reset instant thereof.

The pulse generated in the read out conductor triggers the flip-flop F to such a state that the gate G becomes non-conducting so that the binary counters are stopped by the absence of stepping pulses S2. In addition the read out pulse can be transferred to the tape feed mechanism D of the tape punch so that the tape is fed one step at a time and so will condition prepare the punch H for operation at the same time as the number read out from the two binary counters releases an operation for punching a code group signal corresponding to the reset core and to the number or signal identifying the operated switch and thus the person represented by the switch. Alternatively one speed step of the punched tape can be initiated by each punching operation of the punch pins of the punch H. Also other methods for controlling the tape feed are possible.

When the matrix is scanned and the punch H is actuated by the detection of a set core scanning of the matrix must be stopped until the punching operation is finished, by which possibly one or several rows of the tape, are punched. Otherwise a further set core if any, which is detected by scanning during said punching operation cannot result in a corresponding further punching operation. Said scanning stop may be achieved by inhibit line IL shown in FIG. 1 between the punch H and the gate G, the punch transmitting an inhibiting signal to inhibit the gate until the present punch operation is finished. The following pulse S4 supplied to flip-flop causes the gate to be conducting so that the pulses S2 again are passed to the binary counters so that scanning of the matrix is restarted.

In order to ensure that the binary counters are inoperative during each period T1, during which pulses from the switches OM1, OM2, etc., can set the appropriate cores of the matrix, said period T1 is initiated by the gate G control pulse S3 and finished by the signal S4 which starts the scanning cycle. Thus, each signal from the punch H, the signal S3 and each signal from the amplifier V block the gate so that the binary counters BRS and BRR are stopped whereas each signal S4 (coincident with the pulses S2) renders the gate conducting so that the binary counters operate, provided that the gate is not inhibited by an inhibiting signal from the punch H.

As the conventional tape punches are designed to punch only one row with at most eight positions (holes or no holes) in each row, several rows must usually be punched for each marking code, i.e., for scanned each set core of the matrix. Thus a division of the code to be punched into two or more parts must take place in the punch H. This can be arranged in many different ways. For example, blocking of the gate causes a pulse to be fed to the punch, which pulse causes or enables the punch to punch a first row. This row of the record represents the output of the binary counter BRS. Then a second row is punched and represents the setting (contents) of said counter and possibly also other information, for example the clock time of recording and/or the statement "arrival." Also three rows can be punched, said third row being controlled by clock time pulses for recording the clock time. Said punching of the second row may be caused by switching the control means of the punch H to the second counter BRR by means of the return of the punch pins or by means of a delayed pulse derived from the above mentioned pulse.

It is assumed above that punched tape and a tape punch are used. If instead magnetic recording on a tape or drum is to be used, stopping of the matrix scanning as described above may be dispensed with. Of course it is possible to use other methods of recording than magnetic or mechanical. It is also possible to punch cards or to print on cards. Within the scope of the claims it is possible to modify the system V, F, G, BRR, BRS, AKR, AKS, H and D partly or wholly in many ways.

If a person switches his switch toggle (OM) from the position "present" to "absent," or vice versa, the corresponding matrix core is set, and the code number of that person is recorded on the punched tape. If he accidentally switches the toggle forwards and backwards, it is possible that two sequential recordings may appear on the tape. Such a double recording is practically harmless and of no importance as, in the worst case, an absence of one minute will be recorded and will be readily recognized as a mere error both when viewing the record visually or evaluating the record automatically in a computer.

For the purpose of checking his or her presence it is desirable to record the time when the person arrives or departs. This can be obtained by recording the clock time on the punched tape immediately after each recording of a person. If, for example, two persons happen to operate their switches OM within the same recording period T1 of the matrix so that a punched record of a person is immediately followed by the record of another person, it does not matter if only the second of said two records is followed by a clock time record. Recording of clock time may be intricate however, mainly depending on the fact that the clock time must be coded for example by means of photoelectrically or magnetically scanned, slowly rotating code discs representing the minute and hour hands of a clock. In addition a special circuit is required to prevent simultaneous recording of personal information and time. For example, the return stroke of the punch after a personal record, or a pulse sent from the amplifier V to the tape feed device D, may release a time recording operation, during which scanning of the matrix is prevented (stopped) until time recording has been finished.

FIG. 2 shows a fairly simple arrangement for recording the time. One of the cores K$m$ of the matrix is used for recording minute pulses from a clock U, which may be an electrical synchronous clock having the necessary gearing R for driving one minute contact disc MS and one twenty four hour contact disc DS where the minute disc MS supplies a very short pulse every minute from a current source such as illustrated by battery $b$ through resistor $r_3$ to core K$m$. Immediately after said recording, the minute core is reset, causing the punched tape to be provided with a minute code which is always the same independent of the clock time and may be a single hole. If desired, it is possible to record a further code every twenty four hour and/or every hour in the same way by means of a core K$d$, i.e., one pulse for each twenty four hours or each hour, respectively, besides or together with a coincident minute pulse. Contact disc DS pulses core K$d$ with a current pulse from source $b$ through resistor $r_4$. The personal and time recordings can, thus, never be coincident nor interfering.

Using this method the tape is punched with minute records 60 times each hour independently of the personal records. If, for example, 1,000 persons are to be checked in it is necessary to record at least 2,000 time indications if the absolute clock time is to be recorded after each personal record twice daily. To avoid the necessity of using abnormally wide tapes each recording has to cover at least two rows on the tape. If there are five channels on the tape—the channels are defined in the longitudinal direction of the tape—it is necessary to record the clock time 00.00 to 24.00. For this purpose at least 12 binary positions are required, that is three rows for each time recording, although this number may be reduced to two rows by means of certain simplifications.

When the method described above is used and only minute pulses are to be recorded, no more than one row per minute is required, irrespective of the number of persons. The minute pulse recordings may be combined with the personal recordings on the tape. 1,000 minute pulses correspond to a time of more than 16½ hours which means considerably less punch wear and lower paper tape consumption than if the absolute clock time is recorded.

If a reference time where the timing by means of minute pulses is supposed to begin is recorded on the tape, or, if this reference time is fed into the computer used for reading and processing the punched tape, the recorded minute pulses and the twenty-four hour or hour pulses which, perhaps, may be added for checking purposes, can be read from the tape and can be summed up and translated into the absolute time which is automatically printed on the card or list or similar record printed by the computer.

In the description above it has been presumed that the pulses generated by the switches OM do not indicate whether a person has arrived or departed. Usually it is not necessary to discriminate these pulses as, during the data processing of the information on the tape it is possible to presume that every second pulse (the add pulses) from the same core indicates an arrival and the (even) other pulses indicate a departure.

However it is possible, according to the inventive embodiment illustrated in FIG. 3, to use switches indicating the direction of movement of the toggle. From this figure it is obvious that a change-over switch is temporarily closed in one or the other direction depending on the direction in which the toggle is moved. Thus, if the intermediate contact which is actuated by the toggle is connected to the conductor S1 in FIG. 1, and if the two outer contacts are connected to ground through a common resistor or separate resistors, and to the set conductors of the appropriate matrix cores, the matrix differs from the matrix according to FIG. 1 only in that it contains two cores for each switch OM and, thus, for each person to be checked. The resetting scanning of the matrix, i.e., successive resetting of the matrix, core by core, by resetting pulses scanning the matrix means that a read-out pulse applied to the input of the amplifier V may appear at two somewhat different instants depending on whether the toggle of the switch OM has been switched in one direction or the other. Alternatively a pair of matrices may be provided, one for recording the arrival of each person and one for recording the departure of each person, the binary counters and the translators being common to both matrices. The two matrices may even have common row and column conductors, which measure, however may meet practical difficulties. The arrival and departure of a person is indicated by that of the two matrices for arrival and departure, respectively, from which the read-out pulse is obtained. Also other methods for descrimination are possible. In all these cases it is a fairly simple matter to complete the record punched in the tape with postscript which requires one binary position only and indicates whether the person has arrived or departed at the instant of recording.

The switches OM according to FIGS. 1 and 3 may be push button operated, e.g. In the embodiment according to FIG. 3 two push buttons for "arrival" and "departure," respectively, may be used. Also other kinds of switches may be used, for example three-position switches having a nutral intermediate position, or rotatable switches with several positions for indicating where the person intends to stay. In this case it may be sufficient if change-over from any position in a group of "in" positions to a position in a group of "out" positions results in a pulse which actuates the corresponding matrix core.

If the distance between the switches OM and the other parts of the system is long, for example if a set of switches is required at each of a number of very distant entrances of a building or an area, it may be desirable to reduce the number of conductors connecting the switches (switch panels) to the other parts of the equipment.

FIG. 4 schematically shows how the cores and the switches may be arranged in pairs in a bipolar circuit, if there is, as in FIG. 1, only one core for each switch and, thus, for each person. Two such cores have a common set conductor, which however passes through the two cores in opposite directions, so that a whole current in one direction sets one core K1 and simultaneously resets the other core K2. A whole current in the reverse direction resets core K1 and sets core K2. The two corresponding switches OM1 and OM2 are connected such a way that they supply a whole current in either of two opposite directions (plus or minus) so that only one single line is required between each pair of switches and the associated pair of cores. Such current pulses of opposite polarity may be obtained by replacing the conductor S1 of FIG. 1 by a pair of conductors S1*a* and S1*b*, the first conductor of which is supplied with the waveform S1, see the lower part of FIGS. 1 and 4, whereas the second conductor S1*b* is fed with an inverted waveform of S1, i.e., with a waveform of opposite polarity than that of S1. The total number of lines required for all switches OM is $2+n/2$ wherein $n$ is the number of switches.

The same number of interconnecting lines is sufficient also in the circuit shown in FIG. 5 which is the same as in FIG. 4, except for the fact that one core K1 of each pair has twice the number of set conductors (for example two) of the other core K2. One of the conductors corresponding to S1 in FIG. 1 is fed with a signal S1*b* being identical with the signal S1 shown in FIGS. 1 and 5 and, thus being a whole current while the other conductor is fed with a signal S1*a* having the same waveform but half the amplitude. The weaker half current S1*a* can only set the core K2 having twice the number of turns of winding and is supplied when the switch OM2 is manually operated. The stronger whole current pulse S1*b* sets each of the cores K1 and K2 when the contacts of the switch OM1 are temporarily closed by throwing over the toggle of switch OM1.

If the switch OM1 is changed over and the core K1 is set, the scanning operation and the recording process are the same as those described in the above embodiments. If the switch OM2 is actuated so that each of the cores K1 and K2 is set, the core K1 is the first one of the two cores which is read during the scanning cycle, and a record is made as though the switch OM1 had been operated. During the scanning cycle immediately following, also the core K2 is read. Consequently two successive recordings corresponding to K1 and K2 will be punched into the tape. The computer may be such a manner that it interprets such a double recording as if the switch OM2 only had been operated. It is also possible to scan the cores pairwise analogous with conventional interlaced scanning generally used within the television technique. Referring to FIG. 5 this scanning would be an interlaced column scanning technique where first the odd and then the even columns are scanned, preferably during one and the same scanning cycle, causing for example K1 and K2 each to be scanned during separate half scanning cycles corresponding to two interlaced television frames. In the arrangement shown in FIGS. 6 and 7 the scanning of the matrix is divided in four such column interlaces correponding to four television frames in each picture.

In order to prevent recording errors from appearing in the circuit shown in FIGS. 4 and 5 a certain minimum time interval must elapse between the instants of closing of the two switches of one and the same pair. This minimum interval depends on the maximum time required for completely scanning the matrix and recording the codes of the set cores found as it might happen that the two switches of one and the same pair are operated simultaneously. In such a case the risk of making erratic recordings can be eliminated by a time multiplex coincidence circuit shown in FIG. 6.

In the upper part of FIG. 6 the matrix RM is very schematically shown, the oblique lines representing cores K. The read-out, column and row conductors have been omitted in FIG. 6. In operation, the matrix is divided in four groups being connected to separate signal sources S1*a*–S1*d* through series resistors. The switches OM are similarly divided in four groups and are connected between the signal sources and the set conductors as may be seen from FIG. 6.

The generated signals and their relative timing are shown on the right of the four signal sources in FIG. 6. Each core is threaded by two set conductors, one of which is common to several cores, for example four cores and is connected to the output of several switches OM through a resistor, and the other of which is common to several other cores and is connected to one of the signal sources through a resistor. These resistors are so chosen that each signal source sends half current pulses through the set conductors connected to it and when the contacts of a switch are closed, a half current pulse, also transmitted by the signal source, is sent by way of the closed switch to the other set conductor. Thus a core is set if two coincident half current pulses appear on each of the two set conductors of a core so that the core is switched. When the matrix is scanned the cores are reset in the same way in the arrangement shown in FIG. 1. If the number of switches OM1, OM2, etc., is $n$, the number of conductors required between the current sources and the remaining apparatus is equal to $g+n/g$. In practice a balancing appraisal will be required to decide the extent to which the number of such conductors should be reduced and the number of pulse generators be increased, or vice versa, as the actual case may be.

FIG. 7 shows a modification of the circuit shown in the upper part of FIG. 6, viz, the part above the dash-dot line in FIG. 6. In the circuit of FIG. 7, the vertical set conductors are simultaneously used as the column conductors of the matrix, which conductors as before, are connected between the code translator AKS (or another type of scanner) on one side and a earthed resistor on the other side. However, the outputs of the code translator are connected to the column conductors through special gates L, which are provided with a grounded input and a control input connected to one of the signal sources S1*a*–S1*d*. It is to be noted that the set signals transmitted by the signal sources S1*a*–S1*d* pass through the column conductors in a direction opposite to that of the scanning resetting output of the code translator AKS, so that the two opposite current directions can be kept apart (discriminated) by the gate L. Said gates are of the "exclusive OR" type so that only a set signal from a signal source or only a scanning signal from the translator AKS are passed to the column conductor, whereas coincident signals are not passed.

FIG. 8 and FIG. 9 each show an example of such a gate known per se so that they are not closer described. The gate shown in FIG. 8 comprises two transistors and a transformer. The gate according to FIG. 9 comprises a triode and a diode, which may be semiconductor elements. In the circuit according to FIG. 9 no transformer is required but the amplitudes of the gate controlling voltage pulses must be correlated in a definite manner which is exemplified in FIG. 9 by showing two such correlated signals adjacent to the inputs connected to the signal source and the code translator respectively. The respective potential levels −10, +10 and −15 are indicated in FIG. 9 and are related to the cathode potential of the triode, which is −10 volts with respect to ground (earth).

Finally practical operation data are shown below for a device according to the invention, by which the information is recorded by punching tapes or cards.

| | |
|---|---|
| Reading and resetting the matrix | T2=2 milliseconds. |
| The period during which the contacts of any switch OM remain closed | 10 milliseconds. |
| The number of matrix readings during the period T2 | 2. |
| Punching speed (when 2 rows are punched on the tape for each recording) | 24 records/sec. |
| Required length of tape per week and checked person | 7—8 cms. |
| Required time for reading a tape for 1,000 persons and one week | About 40 seconds. |
| Data handling time in a computer for 1,000 persons and one week | A few seconds. |

I claim:

1. In a system for recording the time of arrival and departure respectively of persons, the combination comprising a matrix of two-state memory elements, a plurality of manually operable switch means, at least one such switch means being provided for and individual to each person whose arrival and departure are to be recorded, each said switch means momentarily coupling one of a plurality of "set" conductors to a set-pulse source to set at least one of the memory elements to a first one of its two states, said switch means being arranged such that the duration of the momentary connection through the switch means, when manually operated, is greater than the interval between two successive pulses from said set-pulse source, means for repeatedly scanning said matrix to reset to the other state any memory element which has been set to its first state and for generating a read signal when any memory element is reset, recording means for recording the read signals, and means including a time source for recording actual time or repeated predetermined time intervals simultaneously with said read signals.

2. A system as defined in claim 1 and which further includes means for inhibiting scanning for the duration of the set pulses whereby said memory elements are set and scanned in different periods.

3. A system as defined in claim 2 wherein said means for inhibiting scanning includes two further pulse sources for providing relatively short pulses at the beginning and end of said set-pulses for inhibiting and actuating said scanning means, respectively.

4. A system as defined in claim 2 and wherein said switch means are such that the duration of the connection through the switch means is longer than the interval between any two successive set-pulses.

5. A system as defined in claim 1 wherein each said switch means is of the toggle type and includes a lever movable by the person between two stable positions indicating the presence or absence, respectively of the person.

6. A system as defined in claim 5 wherein each said toggle switch also includes a pair of contacts normally held open by spring means, operation of the switch lever serving to close said contacts for a short time substantially independent of the time taken to move the switch lever from one to the other of its two stable positions.

7. A system as defined in claim 1 wherein said memory elements are divided into pairs and coupled by said "set" conductors to corresponding pairs of contacts of each said switch means, there being one pair of contacts for each memory element, and there being one pair of memory elements allocated to each person and being set to the said first state to indicate arrival and departure, respectively of a person.

8. A system as defined in claim 1 and which further includes means controlled by said recording means for inhibiting scanning while a read signal is being recorded.

9. A system as defined in claim 1 wherein said time recording means includes means for setting at least one additional memory element of said matrix whereby upon reading this additional element a time record is made.

10. A system as defined in claim 1 wherein said memory elements are constituted by magnetic cores threaded by row and column conductors connected to said scanning means for re-setting the cores to their said other state by means of currents in the row and column conductors which, when coincident, are of sufficient magnitude to reset the cores, and a read conductor also threading said cores in which the read signals are induced when cores are reset, said set-pulse source passing a current sufficient to set a core when any one of said switch means is operated.

11. A system as defined in claim 1 wherein said memory elements are divided into pairs and each pair is provided with a common set conductor, one of said memory elements being set to its said first state by a current in one direction in the common set conductor and the other memory element being set to its said first state by a current in the opposite direction, said set-pulse source having two outputs each providing pulses of one polarity opposite to the polarity of the pulses from the other, and said switch means being so divided into pairs corresponding to the pairs of said memory elements that each said switch means controls one memory element by connecting the common set conductor of the corresponding pair of memory elements to one of the said outputs.

12. A system as defined in claim 1 wherein said memory elements are divided into pairs and each pair is provided with a common set conductor, one of said memory elements of a pair requiring a current in the set conductor of a relatively low magnitude to set it to its said first state, and the other memory element of the pair requiring a current of a relatively large magnitude to set it to its said first state, said set-pulse source having two outputs which provide pulses having relatively high and low magnitudes respectively and said switch means being so divided into pairs corresponding to said pairs of memory elements that operation of one switch means of a pair sets one of said memory elements of the correlated memory pairs by connecting the output from said set-pulse source which provides pulses of low magnitude to the common conductor of the corresponding pair of memory elements and operation of the other switch means of the same pair sets both memory elements by connecting the other output from said set-pulse source which provides pulses of high magnitude to the common conductor.

13. A system as defined in claim 1 wherein said set-pulse is connected to row and column set conductors, either each row or each column being connected by way of said switch means, said set-pulse source providing set pulses to one column or to one row and at the same time by way of one of said switch means if closed to each row, or column, respectively, in sequence and then to the next column or row and at the same time in sequence to each row again or column respectively, etc., coincident currents in both row and column set conductors being required to set a memory element, and the time for each switch means conducts being longer than the interval between sending coincident set pulses to the row and column set conductors of each memory element.

14. A system as defined in claim 13 wherein said matrix comprises a plurality of submatrices, and said set-pulse source comprises an equal number of subsources for generating relatively time-displaced pulse trains, each said subsource being both connected to a row or column set conductor of each submatrix and through a group of switch means to a column or row respectively, set conductor of each submatrix.

15. A system as defined in claim 14 wherein the same row and/or column conductors are used for setting and scanning, including a plurality of electrically-controlled switch means, one for each row and/or column conductor, for alternately connecting the conductor to one of the subsources, or said scanning means, whereby coincidence of setting and scanning signals is avoided.

References Cited

UNITED STATES PATENTS

| | | | |
|---|---|---|---|
| 2,895,124 | 7/1959 | Harris | 340—174 |
| 3,017,611 | 1/1962 | Stemme | 340—172.5 |
| 3,225,333 | 12/1965 | Vinal | 340—172.5 |
| 3,270,322 | 8/1966 | Ledoux et al. | 340—166 |

ROBERT C. BAILEY, *Primary Examiner.*

J. P. VANDENBURG, *Assistant Examiner.*